(12) United States Patent
Agger

(10) Patent No.: US 11,781,527 B2
(45) Date of Patent: Oct. 10, 2023

(54) MONITORING OPERATION OF A WIND TURBINE

(71) Applicant: Vestas Wind Systems A/S, Aarhus N. (DK)

(72) Inventor: Søren Dyøe Agger, Aarhus N. (DK)

(73) Assignee: Vestas Wind Systems A/S, Aarhus N (DK)

( * ) Notice: Subject to any disclaimer, the term of this patent is extended or adjusted under 35 U.S.C. 154(b) by 288 days.

(21) Appl. No.: 17/293,505

(22) PCT Filed: Nov. 13, 2019

(86) PCT No.: PCT/DK2019/050346
§ 371 (c)(1),
(2) Date: May 13, 2021

(87) PCT Pub. No.: WO2020/098893
PCT Pub. Date: May 22, 2020

(65) Prior Publication Data
US 2021/0404441 A1    Dec. 30, 2021

(30) Foreign Application Priority Data

Nov. 16, 2018 (DK) .......................... PA 2018 70753

(51) Int. Cl.
*F03D 17/00* (2016.01)
*F03D 80/00* (2016.01)
(Continued)

(52) U.S. Cl.
CPC ............ *F03D 17/00* (2016.05); *F03D 7/048* (2013.01); *F03D 80/00* (2016.05); *G08B 21/187* (2013.01);
(Continued)

(58) Field of Classification Search
CPC .......... F03D 17/00; F03D 7/048; F03D 80/00; F03D 7/046; G08B 21/187;
(Continued)

(56) References Cited

U.S. PATENT DOCUMENTS

2011/0054825 A1* 3/2011 Perla .................. G05B 23/0286
290/44
2011/0270577 A1* 11/2011 Mihok .................... F03D 17/00
702/188
(Continued)

FOREIGN PATENT DOCUMENTS

CA       2764082 A1     7/2012
CN    103026059 A       4/2013
(Continued)

OTHER PUBLICATIONS

Machine Translation of FR 2529674 A1 (Year: 1982).*
(Continued)

*Primary Examiner* — Brandon D Lee
(74) *Attorney, Agent, or Firm* — Wood Herron & Evans LLP

(57) ABSTRACT

A method is provided for monitoring an operational parameter of a wind turbine. The method comprising defining a peer limit, measuring the operational parameter during operation of the wind turbine; and comparing the measured operational parameter to the peer limit. The wind turbine is a member of a peer group of wind turbines, each wind turbine of the peer group comprising a common characteristic. The peer limit is defined using measurements of the operational parameter measured on the wind turbines of the peer group of wind turbines.

13 Claims, 5 Drawing Sheets

(51) Int. Cl.
*F03D 7/04* (2006.01)
*G08B 21/18* (2006.01)

(52) U.S. Cl.
CPC ... *F05B 2270/301* (2013.01); *F05B 2270/303* (2013.01); *F05B 2270/334* (2013.01)

(58) Field of Classification Search
CPC .......... F05B 2270/301; F05B 2270/303; F05B 2270/334; Y02E 10/72
See application file for complete search history.

(56) References Cited

U.S. PATENT DOCUMENTS

| | | | | |
|---|---|---|---|---|
| 2013/0073223 | A1* | 3/2013 | Lapira | F03D 17/00 |
| | | | | 702/34 |
| 2013/0144449 | A1* | 6/2013 | Dalsgaard | F03D 7/048 |
| | | | | 700/287 |
| 2014/0001763 | A1 | 1/2014 | Kragelund et al. | |
| 2016/0084224 | A1 | 3/2016 | Tyber et al. | |
| 2017/0018165 | A1* | 1/2017 | Klein | F16B 1/00 |

FOREIGN PATENT DOCUMENTS

| | | | | |
|---|---|---|---|---|
| CN | 107559144 A | | 1/2018 | |
| FR | 2529674 A1 | * | 7/1982 | .............. G01L 5/26 |
| WO | 2009016020 A1 | | 2/2009 | |
| WO | 2017088878 A1 | | 6/2017 | |

OTHER PUBLICATIONS

Danish Patent and Trademark Office, Search and Examination Report in PA 2018 70753, dated May 29, 2019.
European Patent Office, International Search Report and Written Opinion in PCT Application No. PCT/DK2019/050346, dated Feb. 6, 2020.
China National Intellectual Property Administraion, office action issued in corresponding Chinese Patent Application No. 201980074884. 6, dated Apr. 15, 2023 with English translation.

* cited by examiner

MONITORING OPERATION OF A WIND TURBINE

FIELD OF THE INVENTION

The present invention relates to monitoring a wind turbine, in particular to monitoring an operational parameter of a wind turbine.

BACKGROUND OF THE INVENTION

It is known to monitor the performance of a wind turbine during its operation, to ensure that the wind turbine is performing as expected, and can continue to operate over a life span of decades. Particular operational parameters, such as the amount of vibration in a component or a temperature of a component may be measured and monitored to inform the operator of the operational state of the wind turbine.

An operator may determine that there is a fault with the wind turbine if an operational parameter exceeds a predetermined limit. For example, if the amount of vibration exceeds a safe limit, the operator may determine that the turbine is not functioning normally, and may take action to fix the fault.

Conventionally, such limits are set using baseline measurements. The operational parameter is tracked during an initial period of operation of the wind turbine, when the turbine is first put into use. The behaviour of the operational parameter during the initial period is taken to be indicative of normal operation. If the operational parameter later deviates significantly from this baseline behaviour, it is determined that there is a fault in the turbine.

SUMMARY OF THE INVENTION

A first aspect of the invention provides a method for monitoring an operational parameter of a wind turbine, the method comprising:
  defining a peer limit
  measuring the operational parameter during operation of the wind turbine; and comparing the measured operational parameter to the peer limit;
  wherein the wind turbine is a member of a peer group of wind turbines, each wind turbine of the peer group comprising a common characteristic; and
  wherein the peer limit is defined using measurements of the operational parameter measured on the wind turbines of the peer group of wind turbines.

In some embodiments, defining the peer limit may comprise:
  providing measurements of the operational parameter measured on each of the wind turbines of the peer group during a measurement period;
  averaging the measurements of operational parameter across the measurement period for each of the wind turbines of the peer group to produce a turbine average for each of the turbines;
  averaging the turbine averages to produce a peer average; and
  defining the peer limit using the peer average.

Some embodiments may further comprise:
  determining a variation of the measurements of the operational parameter for the wind turbines in the peer group; and
  defining the peer limit using the variation.

In some embodiments the method may further comprise:
  performing a baseline measurement of the operational parameter on the wind turbine;
  defining a baseline limit using the baseline measurement;
  comparing the baseline limit to the peer limit; and
  if the baseline limit is more limiting than the peer limit, replacing the peer limit for the wind turbine with the baseline limit.

In some embodiments, the method may comprise:
  during an initial period of operation:
    defining a design limit for the operational parameter for the wind turbine;
    measuring the operational parameter; and
    comparing the measured operational parameter to the design limit; and
  after the initial period of operation:
    comparing the design limit to the peer limit; and
    if the peer limit is more limiting than the design limit, performing the steps of measuring the operational parameter during operation of the wind turbine and comparing the measured operational parameter to the peer limit.

In some embodiments, the number of wind turbines in the peer group of wind turbines may be at least 5, or at least 10, or at least 20.

In some embodiments the length of the predetermined period may be inversely proportional to the number of wind turbines in the peer group.

In some embodiments, the common characteristic may be at least one of: a common component, a common component configuration, a common location, and a common operating condition.

In some embodiments the operational parameter may be a vibration, a temperature, a pressure, a positional measure, or a wear debris indicator.

In some embodiments the method may further comprise:
  determining if the operational parameter traverses the peer limit; and
  if so, determining that a fault state exists.

The method may further comprise notifying an operator of the wind turbine that a fault state exists.

In some embodiments, where a fault state is determined to exist, the method may further comprise excluding the wind turbine from the peer group.

In some embodiments the method may further comprise, after a period of operation, re-defining the peer limit using updated measurements of the operational parameter measured on the wind turbines of the peer group of wind turbines.

A second aspect of the invention provides a wind turbine monitoring system comprising:
  a sensor for measuring an operational parameter of a wind turbine; and
  a controller configured to receive measurements of the operational parameter;
  wherein the controller is configured to perform the method of any embodiment of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
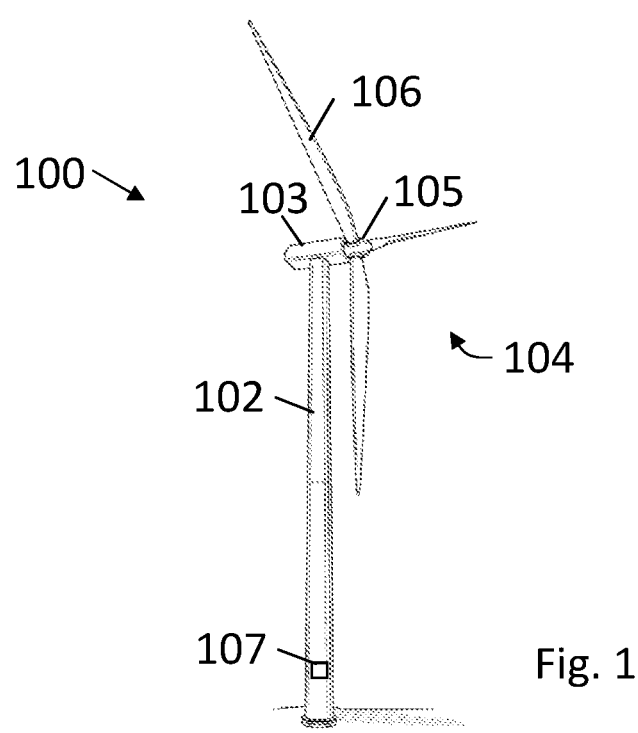
FIG. 1 is a schematic representation of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Wind turbine 100 further comprises one or more sensors 107 configured to measure one or more operational parameters of the wind turbine 100, for example a vibration, a temperature, a pressure, a positional measure, or a wear debris indicator. The position of sensor 107 in FIG. 1 is merely illustrative. Any number of sensors 107 may be placed at any locations on or in the turbine, as would be appreciated by those skilled in the art. The measurements from such sensors 107 are used to monitor operation of the wind turbine 100. Limits may be defined for each operational parameter, indicative of the limit of normal operation. If the measured operational parameter traverses (e.g. exceeds, where the limit is an upper limit) the limit, the operator of the turbine 100 may determine that the turbine 100 has a fault, and so may take action to correct the fault.

In some conventional systems, the limit for an operational parameter is defined using a baseline measurement. A baseline measurement is a series of measurements of the operational parameter during an initial period of operation of the turbine 100. These measurements are then used to define an individual limit for that turbine 100.

Using a baseline measurement as the basis for future monitoring of an operational parameter assumes that the baseline period represents a healthy operating condition. This is not necessarily correct. It is not uncommon that faulty conditions are present from commissioning of the wind turbine or immediately after asset overhauls. Such faults form part of the baseline behaviour, and so the fault may not be detected.

Furthermore, the baseline period often requires collection of a substantial number of measurements to apply well defined (i.e. statistically significant) limits. Adding to this is the fact that seasonal and other longer periodic events may influence the operational parameter in such a manner that the baseline period becomes unrepresentative of the natural variances of the operational parameter. These factors increase the duration of the baseline period, delaying normal monitoring of the turbine. It is not uncommon to have baseline periods that last several weeks and even months.

Figure 2:
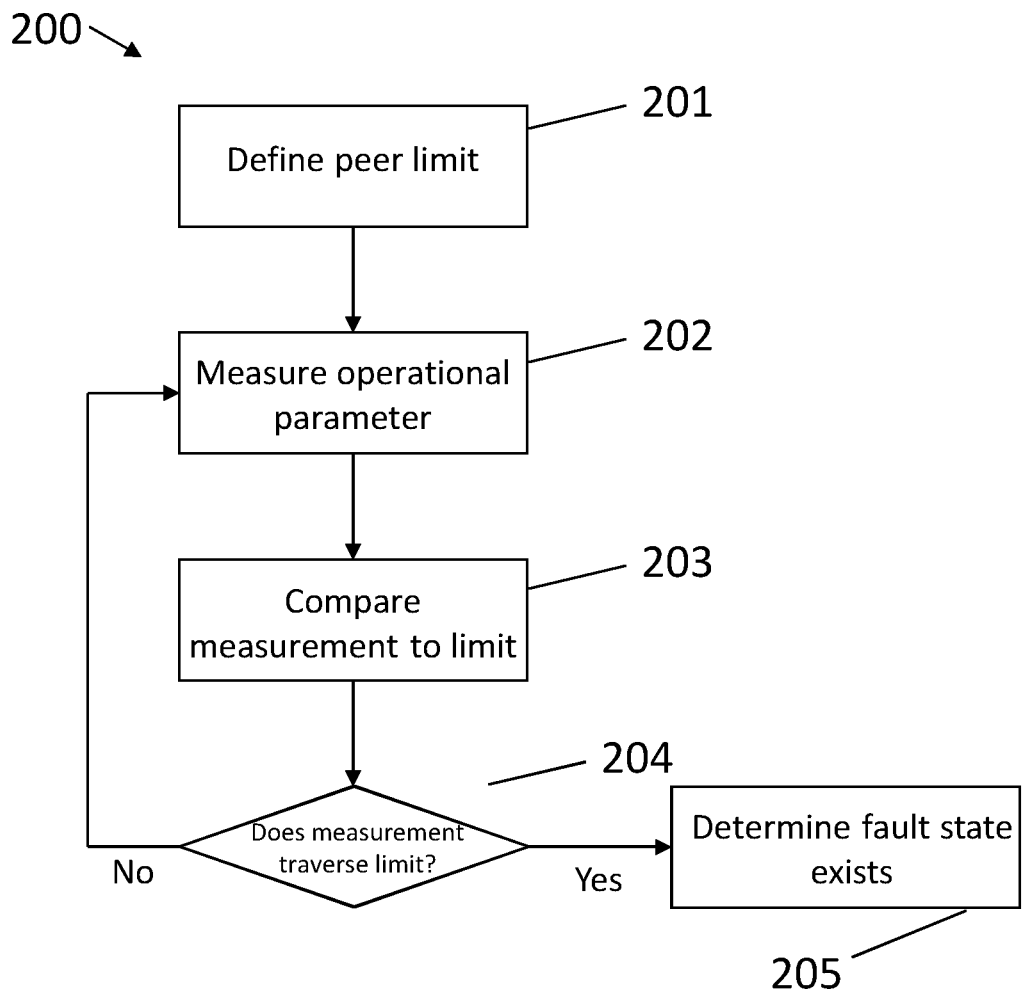
FIG. 2 illustrates a method of monitoring an operational parameter of the wind turbine.

FIG. 2 illustrates a method 200 of monitoring an operational parameter according to the present invention. Method 200 does not require a baseline measurement to be used to define a limit for an operational parameter.

Method 200 starts at step 201, in which a peer limit is defined for an operational parameter of a wind turbine. The peer limit is defined using measurements of the operational parameter measured on wind turbines of a peer group of wind turbines of which the wind turbine 100 is a part. Each wind turbine of the peer group comprises a common characteristic or common characteristics. For example, the common characteristic(s) may be a common component, a common component configuration, a common location, and/or a common operating condition. The turbines of the peer group may be of the same asset class, or may be located in the same wind park, or the same section of a wind park, or may be subject to the same or similar prevailing weather conditions (whether located at the same site or not), or may have the same drive train configuration and/or may have the same sensor arrangement. Measurements performed on the turbine 100, for which the peer limit will be used, may be included when defining the peer limit, or may be excluded.

Method 200 then proceeds to step 202. At step 202 the operational parameter is measured during operation of the wind turbine 100, for example using sensor 107.

Method 200 then proceeds to step 203. At step 203 the measured operational parameter is compared to the peer limit.

The method 200 may then optionally proceed to step 204. At step 204 it is determined if the operational parameter traverses the peer limit (e.g. exceeds an upper limit). If the operational parameter does traverse the peer limit, the method 200 proceeds to step 205, in which it is determined that a fault state exists—i.e. that the wind turbine 100 has a fault.

If, on the other hand, the operational parameter has not traversed the peer limit, the method returns to step 202, to repeat the monitoring of the operational parameter. The steps 202-204 may be repeated continuously, or may be repeated at a predetermined interval (e.g. 1 minute, 1 hour, 1 day) until interrupted by a determination that a fault state exists. In some embodiments the method may re-start at step 201 after a period of operation, or after maintenance of one or more turbines of the peer group. By re-starting from step 201, the peer limit may be re-defined using updated measurements of the operational parameter measured on the wind turbines of the peer group of wind turbines.

The method of the present invention provides a limit for the operational parameter that is based on measurements from other, similar, wind turbines, not just on a baseline measurement performed on the wind turbine itself. This peer limit is much less sensitive to a single faulty turbine than the baseline measurement, and so later faults may be more easily detected by comparing the operational parameter to the peer limit than by comparing to an individual baseline-derived limit.

Furthermore, using measurements from a plurality of wind turbines allows a statistical significant data set to be acquired faster than an individual baseline may be acquired. Indeed, for N turbines in the peer group, the limit may be defined N times faster than for the individual baseline limit. In some embodiments, the peer limit may be defined using historical data, eliminating the time delay before the operational parameter can be monitored on a new turbine.

Defining the peer limit, as in step 201 of method 200, may comprise a step of measuring the operational parameter on each of the turbines of the peer group. Alternatively or additionally, historical data may be used. For example, measurements of the operational parameter taken on similar turbines that are already in operation may be used to define a peer limit for a new turbine 100.

Once the measurements for the peer group have been acquired, the peer limit may be defined based on an average and/or variation of the measurements.

For example, the peer limit may be based on an average of all the measurements taken on all the turbines of the peer group (optionally excluding the particular turbine 100 on which the peer limit will be used). Alternatively, an average value of the operational parameter during a measurement period may be calculated for each turbine of the peer group. These individual averages may themselves be averaged to produce a peer average, and the peer limit may be defined based on this peer average.

When averaging the turbine averages to form the peer average the measurements for the individual turbine, whose operation will be monitored, may be included or may be excluded.

The average may be a mean or median. Averaging the measurements and/or turbine averages may comprise calculating a mean or median of the measurements and/or turbine averages.

The peer limit also be based on a variation of the measurements, such as a variation of all the measurements for all turbines, or a standard variation of the individual turbine averages. The variation may be a standard deviation, variance, a statistical range, for example an inter-quartile range, or any other measure of statistical deviation from an average.

Where the peer limit is defined based on an average and/or variation, defining the peer limit may comprise applying a multiplier to the average and/or variation to arrive at the peer limit.

In a particular example of defining the peer limit, a peer asset group consists of N entities. During a measurement period $T_M$, which may be during the initial period of operation of each turbine, the operational parameter X is measured on each turbine i in the peer group of N turbines, yielding a measurement $X_i$ for each turbine. From these measurements a peer limit is calculated as: Limit_P=A*Avg $(X_1; X_2; \ldots; X_N)$+S*StDev$(X_1; X_2; \ldots; X_N)$, where A and S are multipliers, Avg is the mean of the measurements across the measurement period $T_M$, and StDev is the standard deviation of the measurements. The multiplier A may for example be a value in the range 1-4, and the multiplier S may for example be a value in the range 2-8.

In some embodiments, the individual baseline measurements may still be performed, and an individual baseline limit may be calculated for the turbine 100. The baseline measurements may be taken across a baseline period $T_B$. It may take longer to acquire a statistically significant number of measurements from the individual turbine 100 than it takes to acquire the peer group measurements. In particular, the relationship between the baseline period $T_B$ and the peer measurement period $T_M$ may be $T_M=T_B/N$, where N is the number of turbines in the peer group. N may be any number, but it has been found that the peer limit provides a more accurate representation of expected turbine behaviour when the number of wind turbines in the peer group of wind turbines is at least 5. Larger numbers of wind turbines in the peer group may further increase the accuracy of the peer limit, for example at least 10, at least 20, or at least 50 turbines may be used.

In some embodiments, the individual baseline measurement may be measured as in conventional systems, at the same time as measurements are made for the peer limit. The baseline measurements may continue even after the peer limit has been defined, and monitoring of the operational parameter using the peer limit has begun. Once the baseline measurement is complete, the individual baseline limit may be defined using the baseline measurements. If the individual baseline limit is more restrictive than the peer limit, the baseline limit may be used instead of the peer limit for monitoring the operational parameter on the wind turbine. For example, if the operational parameter is a vibration level, if the baseline limit sets a lower level of maximum vibration than the peer limit, the baseline limit may be used to monitor future vibration levels.

Figure 3:
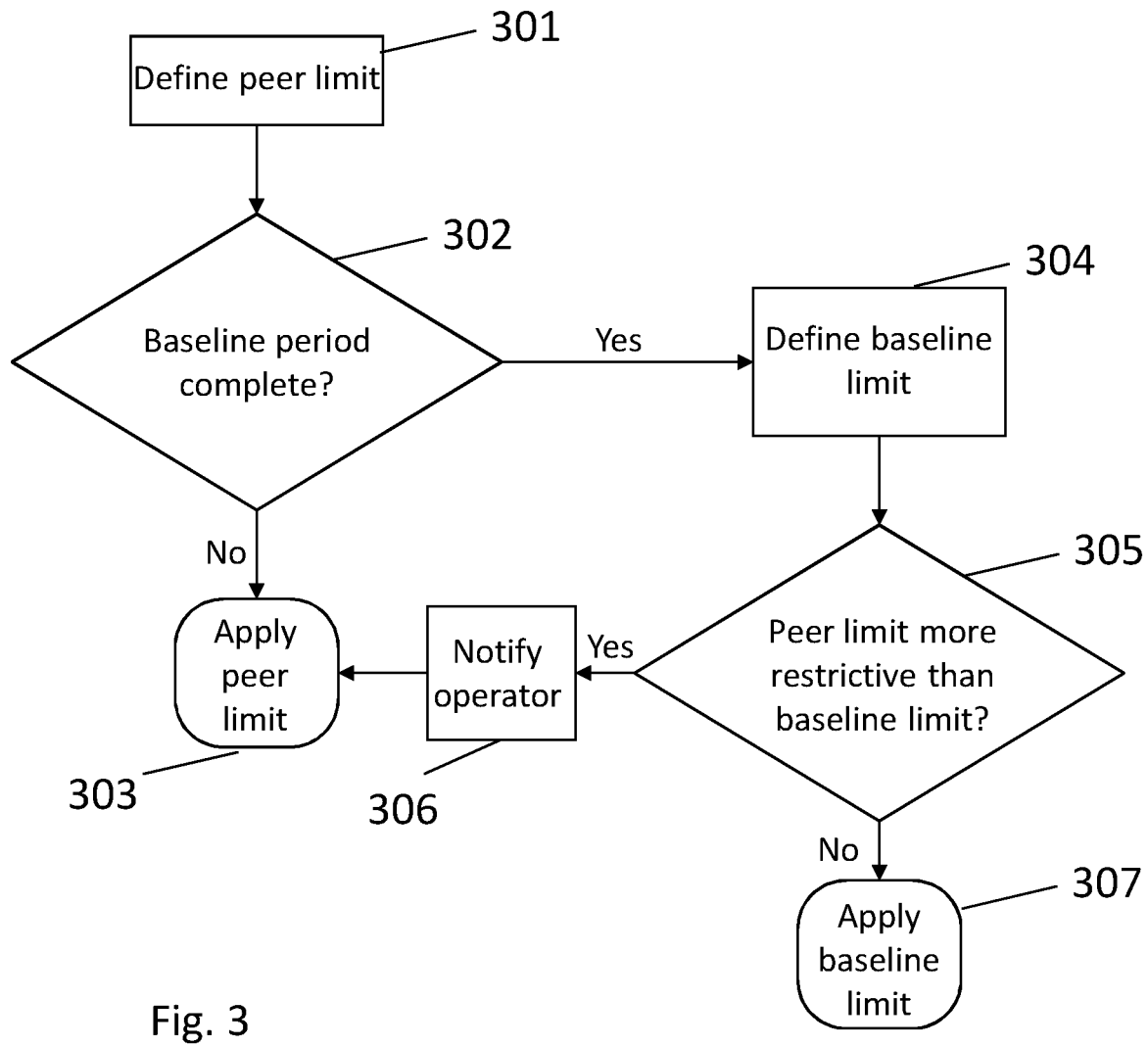
FIG. 3 illustrates a further method of monitoring an operational parameter of the wind turbine.

FIG. 3 illustrates a method 300 in which both a peer limit and an individual baseline limit are defined.

Method 300 begins at step 301, at which a peer limit is defined, as in step 201 of method 200.

The method 300 then proceeds to step 302, at which it is determined if the individual baseline period ($T_B$) is complete—i.e. whether a statistically significant number of baseline measurements have been taken on the turbine 100.

If the baseline period is not complete, the method moves to step 303, in which the peer limit is used to monitor the operational parameter of the turbine 100. This may comprise performing steps 202-205 of method 200.

If the baseline period is complete, the method instead moves to step 304, at which the individual baseline limit is defined. The baseline limit may be calculated from the baseline measurements using known methods. For example, the baseline limit may be defined using an average (optionally multiplied by a multiplier) of the operational parameter across the baseline period plus a variation (optionally multiplied by a multiplier) of the operational parameter across the baseline period.

The method then proceeds to step 305, at which it is determined which of the peer limit and baseline limit is more restrictive (e.g. where the limits define upper limits for the operational parameter, the more restrictive is the lower of the peer limit and the baseline limit).

If it is determined that the peer limit is more restrictive, the method proceeds to step 303, where the peer limit is used as described above. Optionally, at step 306 an operator of the turbine may be notified that the peer limit is more restrictive than the peer limit.

If it is instead determined that the baseline limit is more restrictive than the peer limit, the baseline limit is used to monitor the operational parameter. This may comprise performing steps analogous to steps 202-205 of method 200, but with the peer limit replaced with the baseline limit for the turbine 100.

In some embodiments, the fact that the peer limit is more restrictive than the baseline limit may be used to indicate a fault in the turbine 100. For example, if the peer limit is more restrictive than the baseline limit by a predetermined amount/factor, it may be determined that there is a fault. Additionally or alternatively, if the baseline limit is significantly more restrictive than the peer limit, or more restrictive by a predetermined amount/factor, it may be determined that there is a fault on the sensor 107 measuring the operational parameter. For example, if the sensor 107 incorrectly measures a zero or near-zero value for the operational parameter during the baseline period, the baseline limit will also be near-zero, indicating a faulty sensor 107.

Unless historical data is used for the peer group measurements, there may still be a delay (for example of the measurement period $T_M$) before monitoring of the operational parameter on a new turbine may begin. In some embodiments, a design limit may be used during this initial period, in order to provide a guide for expected behaviour of the operational parameter. The design limit is a predetermined limit, for example calculated when designing the wind turbine 100. During the initial period of operation, the operational parameter is measured and compared to the design limit. If the measured operational parameter traverses the design limit, it may be determined that a fault state exists.

In some embodiments, after the initial period of operation, when the peer limit has been defined, the design limit may be compared to the peer limit. If the peer limit is more limiting than the design limit, then the peer limit is used to monitor the operational parameter (e.g. by following method 200). Otherwise, the design limit may continue to be used for that wind turbine 100.

Such embodiments allow the operational parameter to be monitored, and hence faults to be detected, even whilst the peer group measurements are being taken, eliminating the initial delay in monitoring the operational parameter on a new wind turbine.

The initial period may be the same as the measurement period (i.e. the period during which measurements are taken before the peer limit is defined).

In any of the above embodiments, where it is determined that the measured operational parameter traverses the respective limit (i.e. peer limit, baseline limit, or design limit), it may be determined that a fault state exists. An operator of the wind turbine 100 may be automatically notified of the fault state, in order that steps can be taken to rectify the fault.

A wind turbine which is found to be in a fault state may be excluded from the peer group of wind turbines. Excluding the turbine from the peer group may prevent faulty measurements from that turbine from affecting the peer limit, and hence allows a more accurate peer limit for normal (i.e. non-faulty) operation to be defined. In such cases, the peer limit (as used for other turbines) may be re-defined immediately upon excluding a turbine from the peer group, or may be re-defined at a later, e.g. predetermined, point, such as after a maintenance of one or more turbines of the peer group. The excluded turbine may be re-admitted to the peer group after the fault has been corrected.

Figure 4:
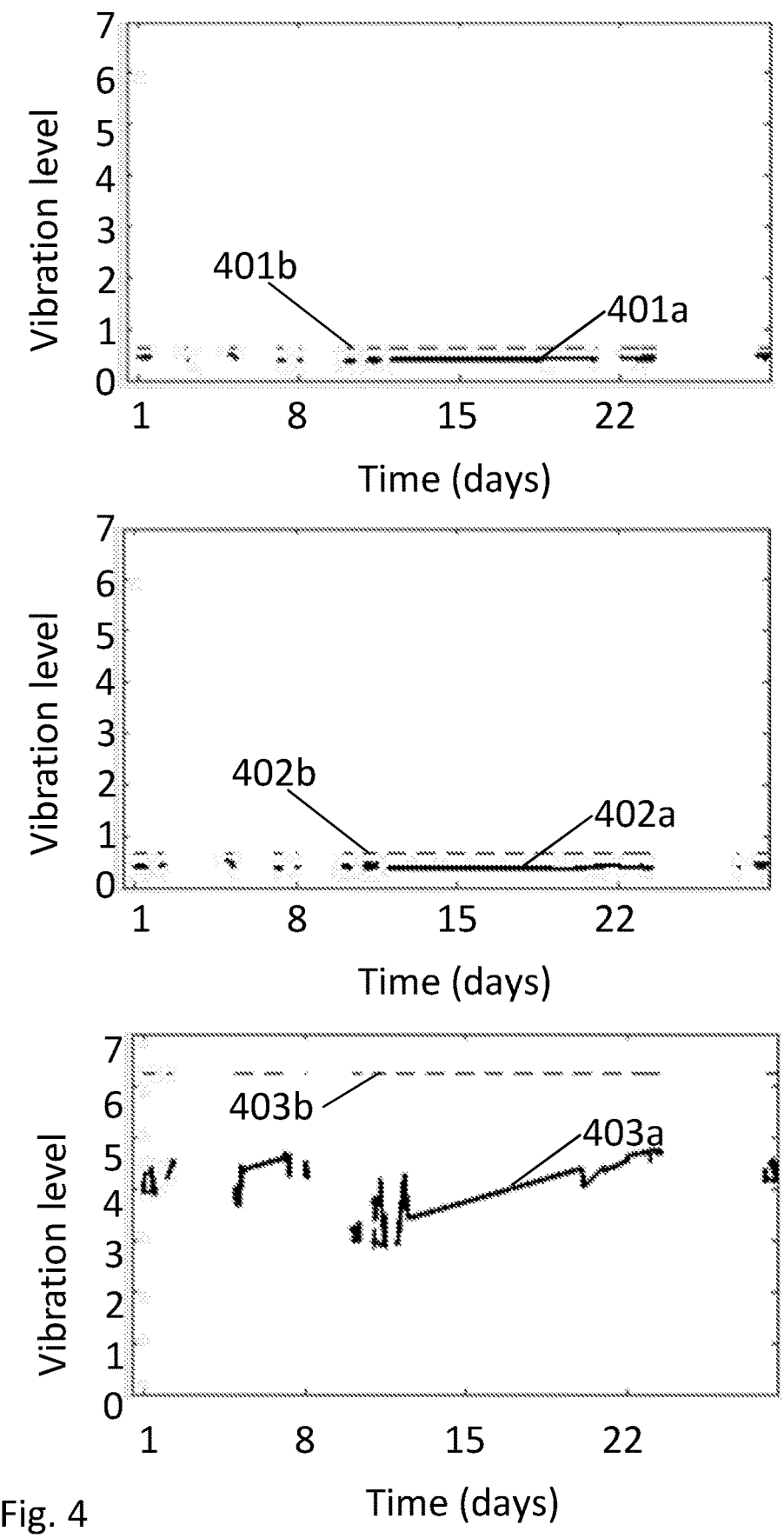
FIG. 4 shows results of baseline measurements on wind turbines of a peer group.

FIG. 4 shows baseline measurements of an operational parameter on a sub-set of wind turbines of a peer group of wind turbines. The measured operational parameter was a vibration, and the peer group comprised 18 wind turbines.

Each individual graph in FIG. 4 corresponds to an individual turbine of the peer group. The lines 401a-403a show the vibration level as a function of time, acquired during 'full load' conditions (i.e. acquired during power production at greater than 80% nominal production). The lines 401b-403b show the individual baseline limit for the respective wind turbine, here calculated as Limit=Avg+5*Stdev, where Avg is the average value of the vibration level across the baseline period, and Stdev is the standard deviation of the measured vibration levels.

As shown in the graphs, the measured vibrations 401a and 402b and corresponding individual baselines 402a and 402b are relatively low. These turbines are functioning normally. However, the vibrations of the third turbine represented in FIG. 4 by line 403a are much higher. The individual baseline limit 403b is set using those high vibration values, and so the individual baseline limit 403b is much higher than limits 401b and 402b. In conventional systems, the third turbine would be considered in isolation to the other turbines. Future monitoring of the vibration level would be based on the very high baseline limit 403b—allowing high vibration levels that should indicate a fault to go unnoticed.

The present invention, however, provides a peer limit to validate the individual baseline limit. The peer limit derived from the full set of turbines of the peer group in this case is 4.62. The individual baseline limit 403b for the faulty turbine is 6.2. As the peer limit is more restrictive than the baseline limit, the peer limit will be used for future monitoring of the vibration level in the wind turbine. If the high vibrations continue, they will traverse the baseline limit and a fault will be detected. The fact that the peer limit is more restrictive than the baseline limit may itself be used to indicate a potential fault in the turbine.

Figure 5:
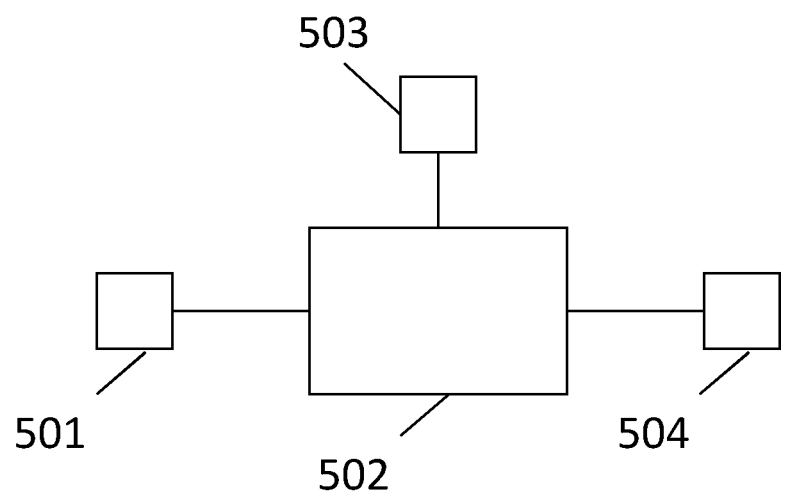
FIG. 5 illustrates a wind turbine monitoring system.

FIG. 5 illustrates an example monitoring system 500 which may be used to implement the methods described above. System 500 comprises a sensor 501 associated with a wind turbine 100, the sensor configured to measure an operational parameter of the wind turbine 100. The sensor 501 may be similar to sensor 107 described above. The sensor 501 communicates measurements of operational parameter to a controller 502. The controller is further in communication with sensors 503, 504 associated with further wind turbines, which are part of the same peer group of turbines as the wind turbine 100. Sensors 503, 504 measure the same operational parameter as sensor 501, and communicate those measurements to the controller 502. The controller 502 uses the measurements from the peer group to define a peer limit, and uses the peer limit to monitor the operational parameter on the turbine 100. For example, the controller 502 may perform the steps of method 200. The controller may similarly monitor the operational parameter on the additional turbines associated with sensors 503 and 504.

In alternative examples the controller 502 may be configured to access a database containing historical measurements of the operational parameter. In such systems, the sensors 503, 504 may be omitted.

The controller 502 may be implemented as a single controller, or as separate components, for example separate controllers for each turbine of the peer group, each controller in communication with the other controllers to share measurements of the operational parameter taken on its respective turbine.

Although the invention has been described above with reference to one or more preferred embodiments, features of one embodiment may be applicable to one or more other embodiments and it will be appreciated that various changes or modifications may be made without departing from the scope of the invention as defined in the appended claims.

The invention claimed is:

1. A method for monitoring an operational parameter of a wind turbine, the method comprising:
    defining a peer limit;
    measuring the operational parameter during operation of the wind turbine;
    comparing the measured operational parameter to the peer limit,
    wherein the wind turbine is a member of a peer group of wind turbines, each wind turbine of the peer group comprising a common characteristic, and wherein the peer limit is defined using measurements of the operational parameter measured on the wind turbines of the peer group of wind turbines;

performing a baseline measurement of the operational parameter on the wind turbine;

defining a baseline limit using the baseline measurement;

comparing the baseline limit to the peer limit; and if the baseline limit is more limiting than the peer limit, replacing the peer limit for the wind turbine with the baseline limit.

2. The method of claim 1, wherein defining the peer limit comprises:

providing measurements of the operational parameter measured on each of the wind turbines of the peer group during a measurement period;

averaging the measurements of operational parameter during the measurement period for each of the wind turbines of the peer group to produce a turbine average for each of the turbines;

averaging the turbine averages to produce a peer average; and defining the peer limit using the peer average.

3. The method of claim 2, further comprising:

determining a variation of the measurements of the operational parameter for the wind turbines in the peer group; and defining the peer limit using the variation.

4. The method of claim 1, wherein the number of wind turbines in the peer group of wind turbines is at least 5, or at least 10, or at least 20.

5. The method of claim 2, wherein the length of the measurement period is inversely proportional to the number of wind turbines in the peer group.

6. The method of claim 1, wherein the common characteristic is at least one of: a common component, a common component configuration, a common location, and a common operating condition.

7. The method of claim 1, wherein the operational parameter is a vibration, a temperature, a pressure, a positional measure, or a wear debris indicator.

8. The method of claim 1, further comprising:

determining if the operational parameter traverses the peer limit; and if so, determining that a fault state exists.

9. The method of claim 8, further comprising notifying an operator of the wind turbine that a fault state exists.

10. The method of claim 8, further comprising excluding the wind turbine from the peer group.

11. The method of claim 1, further comprising, after a period of operation, re-defining the peer limit using updated measurements of the operational parameter measured on the wind turbines of the peer group of wind turbines.

12. A wind turbine monitoring system comprising:

a sensor for measuring an operational parameter of a wind turbine; and a controller configured to receive measurements of the operational parameter;

wherein the controller is configured to perform the method of claim 1.

13. A method for monitoring an operational parameter of a wind turbine, the method comprising:

defining a peer limit;

measuring the operational parameter during operation of the wind turbine;

comparing the measured operational parameter to the peer limit, wherein the wind turbine is a member of a peer group of wind turbines, each wind turbine of the peer group comprising a common characteristic, and wherein the peer limit is defined using measurements of the operational parameter measured on the wind turbines of the peer group of wind turbines;

during an initial period of operation the method further comprising:

defining a design limit for the operational parameter for the wind turbine;

measuring the operational parameter; and comparing the measured operational parameter to the design limit; and after the initial period of operation the method further comprising:

comparing the design limit to the peer limit; and if the peer limit is more limiting than the design limit, performing the steps of measuring the operational parameter during operation of the wind turbine and comparing the measured operational parameter to the peer limit.

* * * * *